(12) United States Patent
Südow et al.

(10) Patent No.: US 9,377,545 B2
(45) Date of Patent: Jun. 28, 2016

(54) STREAMER DESIGN FOR GEOPHYSICAL PROSPECTING

(71) Applicant: PGS Geophysical AS, Oslo (NO)

(72) Inventors: Mattias Südow, Houston, TX (US); Jon Magnus Sorli, Svelvik (NO); Øyvind Hillesund, Nesbru (NO)

(73) Assignee: PGS Geophysical AS, Oslo (NO)

( * ) Notice: Subject to any disclaimer, the term of this patent is extended or adjusted under 35 U.S.C. 154(b) by 196 days.

(21) Appl. No.: 14/186,787

(22) Filed: Feb. 21, 2014

(65) Prior Publication Data

US 2014/0254314 A1    Sep. 11, 2014

Related U.S. Application Data

(60) Provisional application No. 61/774,327, filed on Mar. 7, 2013.

(51) Int. Cl.
*G01V 1/20* (2006.01)
*G01V 1/18* (2006.01)
*G01V 1/38* (2006.01)

(52) U.S. Cl.
CPC ............... *G01V 1/201* (2013.01); *G01V 1/189* (2013.01); *G01V 1/38* (2013.01)

(58) Field of Classification Search
CPC .......... G01V 1/201; G01V 1/38; G01V 1/189
USPC ....................................................... 367/154
See application file for complete search history.

(56) References Cited

U.S. PATENT DOCUMENTS

| | | | |
|---|---|---|---|
| 5,546,882 A | 8/1996 | Kuche | |
| 5,867,451 A * | 2/1999 | Chang | G01V 1/201 174/101.5 |
| 7,376,045 B2 | 5/2008 | Falkenberg et al. | |
| 7,466,627 B2 | 12/2008 | Karlsen | |
| 7,684,281 B2 | 3/2010 | Vaage et al. | |
| 2008/0186803 A1* | 8/2008 | McKey | G01V 1/201 367/15 |
| 2009/0296521 A1* | 12/2009 | Perciot | G01V 1/201 367/24 |
| 2011/0005801 A1* | 1/2011 | Olivier | G01V 1/3852 174/73.1 |
| 2011/0103180 A1* | 5/2011 | Borgen | G01V 1/201 367/20 |
| 2012/0163120 A1* | 6/2012 | Pearce | G01V 1/186 367/21 |
| 2012/0269033 A1* | 10/2012 | Maples | G01V 1/184 367/20 |
| 2012/0287751 A1 | 11/2012 | Elvestad | |
| 2013/0033960 A1 | 2/2013 | McKey, III | |
| 2013/0343155 A1* | 12/2013 | Ozdemir | G01V 1/3808 367/24 |
| 2014/0033500 A1* | 2/2014 | Borgen | G01V 1/201 29/428 |

(Continued)

OTHER PUBLICATIONS

Steve Harries, "Isometric in-line and cross-line sampling advances marine 3D seismic," originally appeared in World Oil, Oct. 2012 issue, pp. 73-78.

(Continued)

*Primary Examiner* — Mark Hellner
(74) *Attorney, Agent, or Firm* — Meyertons, Hood, Kivlin, Kowert & Goetzel, P.C.

(57) ABSTRACT

An apparatus is disclosed that includes a solid-core streamer with particle motion sensors disposed within the solid core. Some embodiments may additionally include one or more pressure sensors that are disposed outside of the solid core. In some embodiments, the apparatus may also include one or more electromagnetic sensors. Also disclosed are various methods of operating an apparatus that includes a streamer with particle motion sensors disposed within the solid core of the streamer.

22 Claims, 4 Drawing Sheets

(56) References Cited

U.S. PATENT DOCUMENTS

2015/0253442 A1* 9/2015 Hartshorne .............. G01V 1/38
367/15

OTHER PUBLICATIONS

WesternGeco, IsoMetrix: Marine Isometric Seismic Technology, www.slb.com/isometrix, 2012 Schlumberger, 6 pages.

* cited by examiner

STREAMER DESIGN FOR GEOPHYSICAL PROSPECTING

CROSS-REFERENCE TO RELATED APPLICATION

This application claims the benefit of Provisional Patent Application No. 61/774,327 filed Mar. 7, 2013, which is incorporated by reference herein in its entirety.

BACKGROUND

This application generally relates to the field of geophysical prospecting. More specifically, the application relates to the field of streamer design. An apparatus that includes a solid-core streamer with particle motion sensors in the core is disclosed. Methods of operating the apparatus are also disclosed.

In the oil and gas exploration industry, marine geophysical prospecting is commonly used in the search for hydrocarbon-bearing subterranean formations. Marine geophysical prospecting techniques may yield knowledge of the subsurface structure of the Earth, which is useful for finding and extracting hydrocarbon deposits such as oil and natural gas. Seismic and electromagnetic surveying are two of the well-known techniques of geophysical prospecting.

For example, in a seismic survey conducted in a marine environment (which may include saltwater, freshwater, and/or brackish water environments), one or more seismic energy sources are typically configured to be submerged and towed by a vessel. The vessel is typically also configured to tow one or more (typically a plurality of) laterally spaced streamers through the water.

Some techniques of geophysical prospecting involve the simultaneous use of seismic and electromagnetic survey equipment. For example, during such a survey, equipment that includes streamers with electromagnetic sensors may be similarly towed behind a vessel. Electromagnetic surveying includes imparting an electric field or a magnetic field into the Earth's subterranean formations and measuring components of the resultant electromagnetic fields. Data collected during such a marine geophysical survey may be analyzed to locate hydrocarbon-bearing geological structures, and thus determine where deposits of oil and natural gas may be located.

A seismic survey commonly employs seismic energy sources such as an array of air guns that produce a seismic wavefield when activated. As used herein, a "wavefield" is a component of seismic data which can be represented by a single velocity field with vertical and lateral variations. In a marine seismic survey, the wavefield typically travels downward through a body of water overlying the subsurface of the earth. Upon propagating into the Earth, the seismic wavefield is then at least partially reflected by subsurface reflectors. Such reflectors are typically those interfaces between subterranean formations having different elastic properties such as density and sound wave velocity, which may lead to differences in acoustic impedance at the interfaces. The reflected seismic wavefield is detected by the sensors such as particle motion sensors and/or pressure sensors in the seismic streamers. A record is made in the recording system of the signals detected by each sensor (or by groups/networks of such sensors). The recorded signals are thereafter interpreted to infer the structure and composition of the subterranean formation.

A typical streamer may be quite long, typically multiple kilometers in length. Some geophysical surveys may be conducted with a single streamer, while some surveys use multiple streamer systems including one or more arrays of streamers. The individual streamers in such arrays are generally affected by the same types of forces that affect a single streamer.

One of the most common types of pressure sensor used in marine geophysical surveying is a hydrophone. A hydrophone is generally understood to be an omnidirectional device. Such hydrophones therefore generally cannot distinguish between the directions of the up-going and down-going wavefields. In particular, seismic energy directly reaching the hydrophones from the source cannot be easily distinguished from the various reflections from the surface of the water and the seafloor (e.g., the "source ghost" and the "receiver ghost"). As a consequence, wavefields of both the source and receiver ghost may interfere with primary reflections, which contain the desired information about the subterranean formations, reducing seismic image resolution and reducing the usefulness of seismic data for reservoir delineation and characterization.

Due to the omnidirectional reception nature of hydrophones, particle motion sensors have also been employed to detect vector quantities during marine seismic survey operations. The term "particle motion sensor" should be understood in the context of this disclosure as referring to any of various types of sensors, including velocity meters, accelerometers, geophones, pressure gradient sensors, particle displacement sensors, etc.

In a multi-component streamer that includes both pressure sensors and particle motion sensors, the combination of signals from pressure and particle motion sensors may be used to remove the "ghosting" effects during seismic data processing. One example of this is described in U.S. Pat. No. 7,684,281, which is incorporated herein by reference in its entirety.

The design of a multi-component streamer thus may take into account multiple factors, including the different responses and noise characteristics of pressure sensors and particle motion sensors, and also electromagnetic sensors. It is desirable for a streamer to be durable and less prone to mechanical and other sources of noise. Improvements may also be desirable in areas such as signal-to-noise ratio (e.g., for both pressure sensors and particle motion sensors), diameter (e.g., a reduced diameter may give reduced drag and easier handling), robustness, etc.

DETAILED DESCRIPTION

This specification includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

This specification may use phrase such as "based on." As used herein, this term is used to describe one or more factors that affect a determination. This term does not foreclose additional factors that may affect a determination. That is, a determination may be solely based on those factors or based only in part on those factors. Consider the phrase "determine A based on B." This phrase connotes that B is a factor that affects the determination of A, but does not foreclose the determination of A from also being based on C. In other instances, A may be determined based solely on B.

Various devices, units, circuits, or other components may be described or claimed as "configured to" perform a task or tasks. In such contexts, "configured to" is each used to connote structure by indicating that the devices/units/circuits/components include structure that performs the task or tasks during operation. As such, the device/unit/circuit/component can be said to be configured to perform the task even when the specified device/unit/circuit/component is not currently operational (e.g., is not on or in operation). The devices/units/circuits/components used with the "configured to" language include hardware—for example, circuits, memory storing program instructions executable to implement the operation, etc. Reciting that a device/unit/circuit/component is "configured to" perform one or more tasks is expressly intended not to invoke 35 U.S.C. §112(f), for that device/unit/circuit/component.

In some embodiments, various items of information relating to geophysical surveying may be embodied in a geophysical data product. A "geophysical data product" may be stored on a computer-readable, non-transitory medium and may embody geophysical data (such as raw streamer data, processed streamer data, two- or three-dimensional maps based on streamer data, etc.). Some non-limiting examples of computer-readable media may include hard drives, CDs, DVDs, print-outs, etc. In some embodiments, raw analog data from streamers may be stored as a geophysical data product. In other instances, the data may first be digitized and/or conditioned prior to being stored as the geophysical data product. In yet other instances, the data may be fully processed into a two- or three-dimensional map of the various geophysical structures before being stored in the geophysical data product. The geophysical data product may be produced offshore (i.e. by equipment on a vessel) or onshore (i.e. at a facility on land) either within the United States or in another country. If the geophysical data product is produced offshore or in another country, it may be imported onshore to a facility in the United States. Once onshore in the United States, geophysical analysis may be performed on the geophysical data product.

A typical streamer generally includes a flexible tubular structure which may be made from polymeric materials such as polyurethane. One or more stress members, generally made of synthetic fiber or other materials with high tensile strength, may be disposed within the tubular structure of the streamer. These stress members generally run along the entire length of the streamer (in known devices, typically along the central longitudinal axis of the streamer) and serve as the main stress-bearing component of the streamer. Typical streamers also generally include one or more types of wiring configured to transmit data and/or power (in known devices, typically also disposed along the central longitudinal axis of the streamer). Streamers may additionally include an exterior jacket or sheath, at least partially covering the exterior of the streamer. The exterior jacket is commonly made of a thermoplastic material.

In some instances, a streamer may contain a solid inner portion, sometimes referred to as the solid "core." The solid core may be a generally cylindrical structure with an outer diameter smaller than an outer tubular structure of the solid streamer. The solid core may be made from materials such as molded or extruded material including thermoplastic polymers. In some cases, such molded or extruded material may initially be in a liquid state. Upon cooling, such material may subsequently become solid. (A "solid" core does not necessarily mean that the core is rigid, incompressible, or inflexible. Solid cores are often bendable, compressible, and/or flexible. Likewise, a "solid" core may not completely fill the interior volume, but the core may have air bubbles as in a static foam, or other cut-outs or voids.) An annular space between the outer structure and the solid core may also in some instances be filled with a solid material, which may or may not be the same as the solid material in the core.

Figure 1:
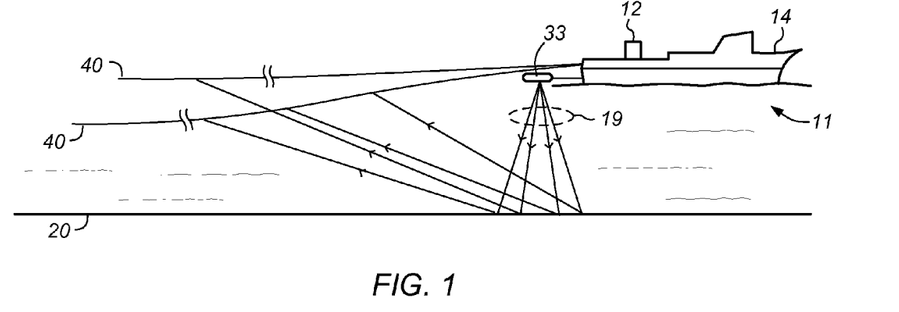
FIG. 1 shows an example of a marine data acquisition system using an apparatus according to one embodiment of the disclosure.

FIG. 1 shows an exemplary marine seismic survey system as it is typically used in acquiring geophysical data for a survey. Vessel 14 may move along a surface of body of water 11 such as a lake or the ocean. Vessel 14 may include source actuation, data recording, and navigation equipment, shown generally at 12 and referred to for convenience as a "recording system." Vessel 14 (or a different vessel, not shown) may be configured to tow one or more energy sources 33 (e.g., a seismic energy source), or arrays of such energy sources in body of water 11. Vessel 14 or the different vessel may tow one or more streamers 40 near the surface of the body of water 11. The streamers 40 may extend behind vessel 14 for several kilometers. Each streamer 40 may further contain various types of sensors (e.g., pressure sensors, particle motion sensors, electromagnetic sensors, etc.), stress members, wiring (e.g., data and/or power wiring), and other components.

In accordance with some embodiments, streamer 40 may be a multi-component streamer, containing both particle motion sensors and pressure sensors, and in some embodiments also electromagnetic sensors. The pressure and particle motion sensors may be configured to detect a seismic wavefield, and the electromagnetic sensors may be configured to detect electromagnetic fields. Pressure sensors may be configured to detect a scalar-valued wavefield, and particle motion sensors may be configured to detect a vector-valued wavefield. The configuration of some embodiments of streamer 40 will be explained in more detail below with reference to FIGS. 2 and 3.

During one embodiment of marine seismic survey operation, seismic energy source 33 may actuate at selected times. When actuated, seismic energy source 33 may produce seismic wavefield 19 that emanates generally outwardly from seismic energy source 33. Seismic wavefield 19 may travel downwardly, through body of water 11, and pass, at least in part, through water bottom 20 into the subterranean formations. Seismic wavefield 19 may be at least partially reflected from one or more acoustic impedance boundaries below water bottom 20, and may travel upwardly and be detected by sensors in streamers 40. The structure of the formations, among other properties of the Earth's subsurface, may be inferred by detections based at least in part on seismic wavefield 19 and by characteristics of the detected seismic wavefield, such as amplitude, phase, travel time, etc.

In an alternative embodiment, in addition to pressure sensors and particle motion sensors, streamer 40 may additionally contain one or more electromagnetic sensors (not shown). These electromagnetic sensors may be configured to measure electromagnetic characteristics of the Earth's subsurface in response to electromagnetic energy sources (also not shown). In certain embodiments, the electromagnetic sensors may be disposed on an outer surface of streamer 40.

The number of streamers, sensors, streamer positioning devices, or other equipment shown in FIG. 1 is only for purposes of illustration and is not a limitation on the number of each device that may be used in any particular embodiment. The broken lines in the streamers 40 indicate that this figure is not necessarily drawn to scale.

Figure 2:
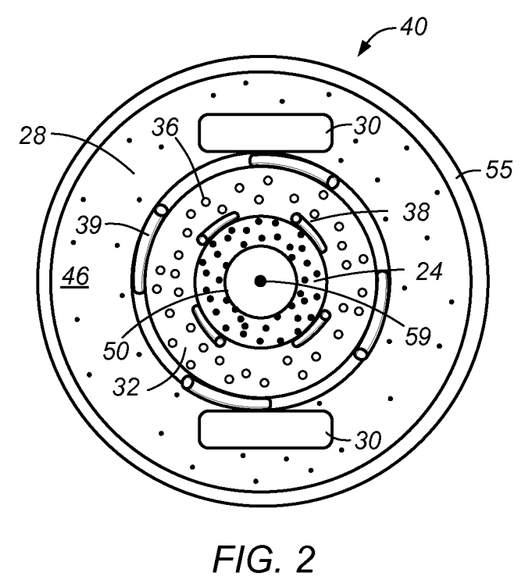
FIG. 2 shows a cross section of an apparatus according to one embodiment of the disclosure.

FIG. 2 illustrates a cross-sectional view of one embodiment of streamer 40. As shown, streamer 40 may include a central portion illustrated as including solid core 24. One non-limiting embodiment of solid core 24 may be a generally cylindrical structure that is bendable, compressible, and/or flexible. Solid core 24 may be situated such that a central longitudinal axis 59 of streamer 40 passes through solid core 24 (e.g., solid core 24 and longitudinal axis 59 may be coaxial). In one such embodiment, the solid material making up solid core 24 may be a molded or extruded material, such as a thermoplastic polymer.

Streamer 40 may also include particle motion sensor 50, pressure sensors 30, stress member 32, inner wiring 38, outer wiring 39, and exterior jacket 55. Exterior jacket 55 may be a plastic tubular structure disposed at least partially around the outer surface of outer portion 28. For example, exterior jacket 55 may provide a mesh covering to the outer surface of streamer 40. In some embodiments, exterior jacket 55 may have cut-outs intended to expose portions of streamer 40 to water, for example, electromagnetic sensors.

In the embodiment of FIG. 2, a particle motion sensor 50 is disposed within solid core 24. Particle motion sensor 50 may be a single particle motion sensor or one of a group (or network) of particle motion sensors disposed at intervals along at least a portion of longitudinal axis 59 of streamer 40.

In some embodiments, a group of particle motion sensors 50 may contain circuitry configured to perform analog-to-digital conversion and/or conditioning (e.g. weighting, noise reduction, etc.) of the particle motion sensor signals. Specifically, such circuitry may be configured to operate on a single particle motion sensor and/or a plurality of particle motion sensors that are wired together (e.g., a plurality of sensors forming an analog group that is configured to output a signal, which is then digitized and/or conditioned by the circuitry).

In the embodiment illustrated in FIG. 2, particle motion sensor 50 is disposed in the center of solid core 24. For purposes of this disclosure, a statement such as particle motion sensor being disposed in the "center" of solid core 24 (or other variations of that phraseology) may be taken to mean that longitudinal axis 59 of solid core 24 passes through at least a portion of particle motion sensor 50, without implying that particle motion sensor 50 is positioned axially symmetrically. In some instances, it may be advantageous for longitudinal axis 59 to pass through the actual center of particle motion sensor 50 (e.g., for solid core 24 and particle motion sensor 50 to be concentric). In some embodiments, other particle motion sensors 50 may be similarly disposed within solid core 24 at selected spacings along longitudinal axis 59.

The placement of particle motion sensor 50 at the center of solid core 24 may be advantageous for various reasons. For example, such a placement may decrease the amount of rotation-related noise picked up by particle motion sensor 50.

In certain embodiments, by molding or otherwise disposing particle motion sensor 50 in the material of solid core 24, particle motion sensor 50 may be held in place within solid core 24. In an alternative embodiment, particle motion sensor 50 may be held in place in solid core 24 by being molded or otherwise disposed within a polymeric material different from the molded or extruded material of solid core 24. In yet other embodiments, solid core 24 may have an opening in which the particle motion sensor 50 may be placed and then secured by a harness, elastic ring, or other method.

In one embodiment, a group of particle motion sensors may include orthogonally aligned sensors configured to measure mutually orthogonal components of particle motion, and/or sensors aligned to a particular axis to measure particle motion components along that axis. For example, such sensors may in some instances measure one or more components of particle motion along a selected axis (e.g., inline, crossline, and vertical components along corresponding axes), etc. In these embodiments, each particle motion sensor in the group may be configured to measure the seismic wavefield at a particular point with respect to a particular direction or axis. For purposes of this disclosure, "align" or "aligned" may be defined as including situations in which objects are disposed within about 5° of perfect co-linearity. Further, for purposes of this disclosure, "orthogonal" may be defined as including situations in which objects are disposed at an angle within about 5° of a right angle.

In the embodiment illustrated in FIG. 2, the network of particle motion sensors, including particle motion sensor 50 may include inner wiring 38, which may be part of the network of particle motion sensors. In some embodiments (e.g., as shown in FIG. 2), inner wiring 38 may be disposed concentrically around solid core 24 (e.g., between solid core 24 and stress member 32). In other embodiments, inner wiring 38 may be disposed within solid core 24. In the cross-section illustrated in FIG. 2, portions of inner wiring 38 are illustrated to represent a helical winding of inner wirings 38 concentric with longitudinal axis 59. As would be understood by one of ordinary skill in the art with the benefit of this disclosure, helical winding is only one of a variety of suitable methods for disposing inner wirings 38 in streamer 40. Helical winding may have the benefit, for example, of allowing streamer 40 to flex without compromising the integrity of the connections provided by inner wirings 38. Inner wiring 38 may be configured to be connected to particle motion sensor 50 mechanically, electrically, optically, and/or by other methods. In some embodiments, inner wiring 38 may also include cables and/or optic fibers. In some embodiments, inner wiring 38 may be configured to transport signals from particle motion sensor(s) 50 to an end of streamer 40. In one such embodiment, the end of streamer 40 may be coupled to vessel 14, such that the signals may be transported to recording system 12 on vessel 14. In some embodiments, the particle motion sensor signals may include those that have been digitized and/or conditioned in the network of particle motion sensors.

In other embodiments, streamer 40 may be divided into a number of separate sections or modules that may be decoupled from one another. In these embodiments, inner wiring 38 may be configured to transport particle motion sensor signals to an end of one such section of the streamer 40. At the end of each section, the signals may be tied into a backbone network of streamer 40 (not shown). The backbone network in this embodiment may extend through each of the sections throughout the entire length of streamer 40.

Such a backbone network may be disposed within or outside of solid core 24. In other embodiments, streamer 40 may include more than one backbone network (e.g., one backbone network for pressure sensor signals, and a separate backbone network for particle motion sensor signals).

As noted above, stress members tend to be located at or near the central axis of the streamer. As shown in FIG. 2, however, streamer 40 may include stress member 32 disposed around solid core 24. Stress member 32 may support the tension along longitudinal axis 59 of streamer 40 (e.g., tension related to streamer 40 being towed by vessel 14). In some embodiments, stress member 32 may be a rope or a cable that is made using high-strength materials such as steel, Kevlar® or other suitable materials. In some embodiments, stress member 32 may be a layer that has high-strength fibers (e.g., fibers 36) disposed within. The placement of stress member 32 around solid core 24 may provide various advantages, such as increased torsional stiffness. The placement of pressure sensors 30 outside of stress member 32 may provide for a higher signal-to-noise ratio in some embodiments.

In certain embodiments, solid core 24 may be disposed at the center of stress member 32. For example, it may be advantageous for solid core 24 and stress member 32 to be concentric. In one embodiment, stress member 32 may include a multitude of strands that may be woven around solid core 24 (e.g., in a cylinder). In other embodiments, one or more stress members 32 may be disposed adjacent to solid core 24. In yet another embodiment, one or more stress members 32 may be part-wise cylindrical around solid core 24.

The embodiment of streamer 40 shown in FIG. 2 may further include one or more pressure sensors 30, each disposed within an outer portion 28 of streamer 40. In the embodiment shown in FIG. 2, solid core 24 is concentric with outer portion 28 along longitudinal axis 59. Alternatively, however, solid core 24 may be disposed off-center within outer portion 28.

Pressure sensors 30 may be bender hydrophones, cylindrical hydrophones, polyvinylidene fluoride (PVDF) hydrophones, or any other suitable pressure sensors that include a pressure-sensitive element. Pressure sensors 30 may each be configured to detect seismic energy in the wavefield reflected by formations as described in FIG. 1. As one or more pressure sensors 30 may be configured to detect signals that are reflected from the subterranean formations under the water surface, a multiplicity of such sensors in the direction of the reflected signals may be beneficial in terms of signal-to-noise ratio. The placement of pressure sensors 30 outside of stress member 32 may provide increased sensitivity. Further, it may be even more advantageous to place pressure sensors 30 at or near exterior jacket 55 of streamer 40 for even further increased pressure sensitivity.

One or more pressure sensors 30 may be connected to outer wiring 39 disposed within outer portion 28. In some embodiments, outer wiring 39 may be disposed within an annular space between solid core 24 and outer portion 28. This annular space may in some instances be filled with the same material from which solid core 24 is made, the same material from which outer portion 28 is made (e.g., filler material 46), or from some other material. In some instances, solid core 24 and outer portion 28 may be made of the same material as one another. Outer wiring 39 may include circuitry (analogous to the circuitry discussed above for the particle motion sensors) that is configured to perform analog-to-digital conversion and/or conditioning of pressure sensor signals. Such circuitry (and/or various other components) may be powered via outer wiring 39, and may be configured to operate on signals from a single pressure sensor or from a plurality of pressure sensors. Outer wiring 39 may further be configured to transmit signals from the one or more pressure sensors 30 to an end of streamer 40 or an end of a section of streamer 40, where the signals may be tied into a backbone network of streamer 40. In some embodiments, electromagnetic sensors disposed at or near the outer surface of streamer 40 may also be connected to outer wiring 39. In the cross-section illustrated in FIG. 2, portions of outer wirings 39 are illustrated to represent a helical winding of outer wirings 39 concentric with longitudinal axis 59. As would be understood by one of ordinary skill in the art with the benefit of this disclosure, helical winding is only one of a variety of suitable methods for disposing outer wirings 39 in streamer 40. Helical winding may have the benefit, for example, of allowing streamer 40 to flex without compromising the integrity of the connections provided by outer wirings 39.

Outer portion 28 may be partially or fully filled with filler material 46. Filler material 46 may in some instances be made from the same solid filler material as solid core 24 (e.g., a molded or extruded material such as thermoplastics). In other embodiments, filler material 46 may be a relatively lightweight and low-density material that may provide some buoyancy to streamer 40. Filler material 46 is shown in FIG. 2 as filling a plurality of voids within streamer 40. In this particular embodiment, filler material 46 may fill spaces in between components discussed above including outer portion 28, solid core 24, inner wiring 38 and outer wiring 39, stress member 32, and one or more pressure sensors 30. In one embodiment, one or more pressure sensors 30 may be suspended within filler material 46. In another embodiment, pressure sensors 30 may be enclosed in respective housings (not shown) that are embedded or molded in filler material 46.

Figure 3:
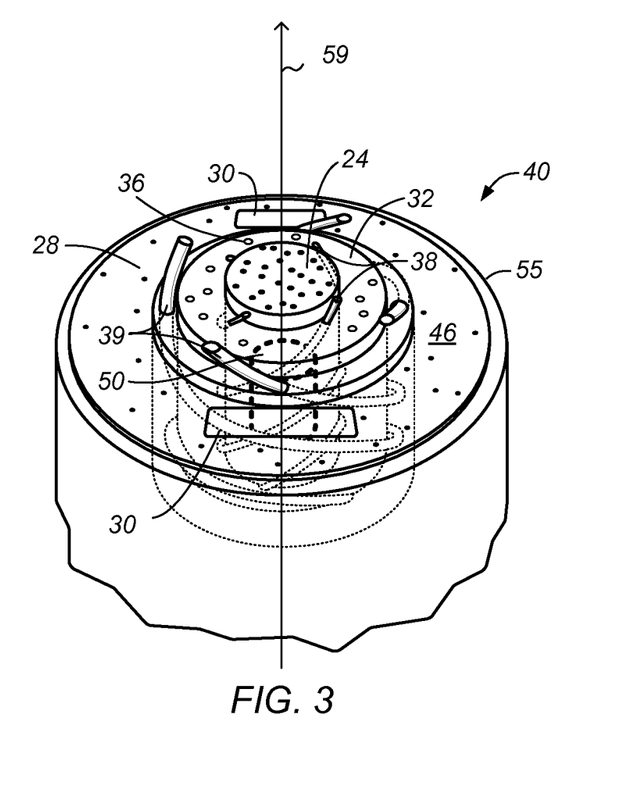
FIG. 3 is a perspective view of the embodiment shown in FIG. 2.

Turning to FIG. 3, which is a perspective view of a cross-section of part of streamer 40 shown in FIG. 2, showing the various components from a different perspective. The uneven line at the bottom of the illustration indicates that only a part of streamer 40 is illustrated, and the dotted lines indicate objects drawn that are otherwise hidden from view.

Figure 4:
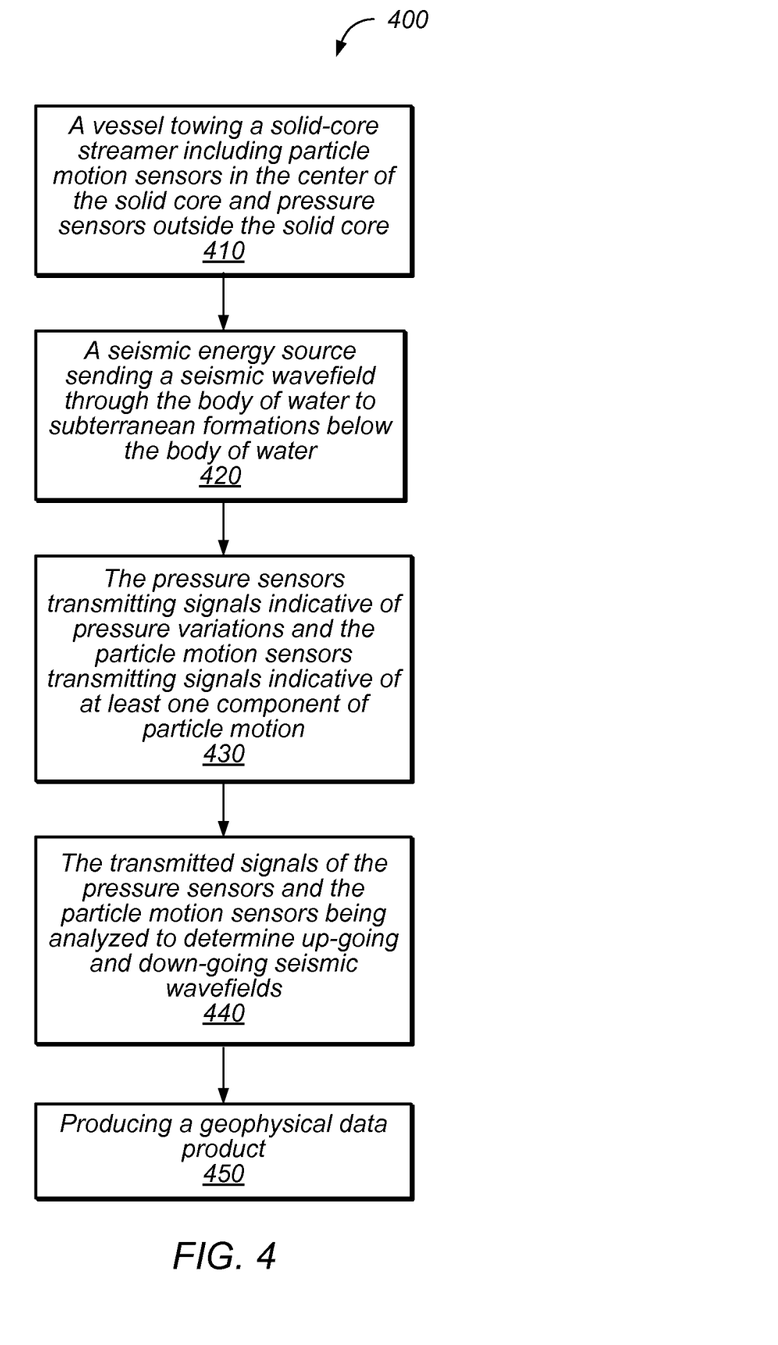
FIG. 4 shows a method according to one embodiment of the disclosure.

FIG. 4 is a flow diagram illustrating one exemplary embodiment of a method 400 for operating an apparatus which includes a solid-core streamer having one or more particle motion sensors disposed in the center of the solid core. The method shown in FIG. 4 may be used in conjunction with any of the computing systems, devices, elements, or components disclosed herein, among other devices. In various embodiments, some of the method elements shown may be performed concurrently, in a different order than shown, or may be omitted. Additional method elements may also be performed as desired. Flow begins at block 410.

At block 410, a vessel tows a solid-core streamer in a body of water. The solid-core streamer may have a solid core that includes one or more particle motion sensors in the center of the solid core. The solid-core streamer may additionally include one or more pressure sensors that are disposed within the streamer outside of the solid core. Flow proceeds to block 420.

At block 420, a seismic energy source is actuated and sends a seismic wavefield through the body of water into the subterranean formations. Flow proceeds to block 430. The subterranean formations may reflect portions of the seismic wavefield, which may then be detected by the particle motion sensors and pressure sensors in the solid-core streamer. At block 430, the one or more pressure sensors transmit signals indicative of pressure variations, and the particle motion sensors transmit signals indicative of at least one component of particle motion. In some embodiments, method 400 ends at 430. In some embodiments, flow proceeds to block 440.

At block 440, a computing system analyzes the transmitted pressure sensor signals and particle motion sensor signals to determine the vertical component of the seismic wavefield. The analysis may include combining the pressure sensor signals with the signals indicative of a vertical component of the motion transmitted by the particle motion sensors in order to determine both an up-going and a down-going seismic wavefield. In some embodiments, flow ends at 440. In some embodiments, flow proceeds to block 450.

At block 450, a geophysical data product may be produced. The geophysical data product may include particle motion sensor signals, pressure sensor signals, and/or analyzed particle motion sensor signals and pressure sensor signals, and the geophysical data product may be stored on a non-transitory, tangible computer-readable medium. The geophysical data product may be produced offshore (i.e. by equipment on a vessel) or onshore (i.e. at a facility on land) either within the United States or in another country. If the geophysical data product is produced offshore or in another country, it may be imported onshore to a facility in the United States. Once onshore in the United States, geophysical analysis may be performed on the geophysical data product.

Some embodiments according to this disclosure may optimize the placement of particle motion sensors within a streamer with respect to factors such as signal sensitivity, noise, and streamer robustness. Some embodiments may improve signal-to-noise ratio during a geophysical survey, increase data reliability, and reduce survey operation cost, increase survey operation uptime and efficiency.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Various embodiments may provide some, all, or none of the described advantages. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

What is claimed is:

1. An apparatus, comprising:
a streamer, wherein the streamer includes:
   a solid core through which a longitudinal axis of the streamer extends, wherein the solid core includes one or more particle motion sensors disposed along the longitudinal axis;
   a stress member disposed concentrically around the solid core; and
   one or more pressure sensors disposed outside the stress member.

2. The apparatus of claim 1, wherein the streamer includes at least one electromagnetic sensor.

3. The apparatus of claim 1, wherein the streamer further includes inner wiring configured to transport signals of the one or more particle motion sensors.

4. The apparatus of claim 1, wherein at least one of the particle motion sensors is disposed in the center of the solid core.

5. The apparatus of claim 1, further comprising:
inner wiring disposed between the solid core and the stress member; and
outer wiring disposed between the stress member and the one or more pressure sensors;
wherein the one or more pressure sensors are disposed in a fluid portion of the streamer, and wherein the fluid portion of the streamer is contained by an exterior jacket.

6. The apparatus of claim 1, wherein the one or more particle motion sensors include at least two particle motion sensors that are orthogonally aligned.

7. The apparatus of claim 1, wherein the solid core comprises a molded or extruded material.

8. The apparatus of claim 1, wherein the stress member includes a plurality of fibers disposed parallel to the longitudinal axis.

9. The apparatus of claim 1, further comprising outer wiring disposed outside the stress member and configured to transport signals of the one or more pressure sensors.

10. The apparatus of claim 9, wherein the outer wiring is configured to supply power.

11. The apparatus of claim 9, wherein the outer wiring is coupled to a backbone network configured to transport signals of the one or more pressure sensors to a vessel.

12. A system, comprising:
at least one streamer; and
a vessel configured to tow the at least one streamer;
wherein the at least one streamer has a longitudinal axis and includes:
   a solid core disposed along the longitudinal axis, wherein the solid core includes one or more particle motion sensors;
   a stress member disposed concentrically around the solid core; and
   one or more pressure sensors disposed outside the stress member.

13. The system of claim 12, wherein the at least one streamer further includes:
inner wiring disposed helically between the solid core and the stress member; and
outer wiring disposed helically between the stress member and the one or more pressure sensors.

14. The system of claim 12, wherein at least one of the particle motion sensors is disposed in the center of the solid core.

15. The system of claim 12, further comprising outer wiring configured to transport signals of the one or more pressure sensors.

16. The system of claim 15, wherein the outer wiring is coupled to a backbone network configured to transport signals of the one or more pressure sensors to the vessel.

17. The system of claim 12 further comprising a computing system configured to analyze signals from the particle motion sensors and pressure sensors.

18. A method, comprising:
towing one or more streamers behind a vessel, wherein at least one streamer includes:
   a solid core through which a longitudinal axis of the at least one streamer extends, wherein the solid core includes one or more particle motion sensors disposed along the longitudinal axis;
   a stress member disposed concentrically around the solid core; and
   one or more pressure sensors disposed outside the stress member;
actuating at least one seismic energy source; and
detecting a seismic wavefield at the one or more particle motion sensors and the one or more pressure sensors.

19. The method of claim 18, further comprising:
transmitting signals indicative of at least one component of particle motion at the particle motion sensors;
transmitting signals indicative of pressure variations at the pressure sensors; and
analyzing the transmitted particle motion and pressure signals.

20. The method of claim 19, further comprising producing a geophysical data product from the transmitted particle motion and pressure signals.

21. The method of claim 20, further comprising recording the geophysical data product on a computer-readable medium suitable for importing onshore.

22. The method of claim 20, further comprising performing onshore geophysical analysis of the geophysical data product.

\* \* \* \* \*